March 6, 1928. 1,661,632
M. C. NIXON
PROPELLER APPARATUS SUITABLE FOR USE IN CONNECTION WITH VARIOUS VEHICLES
Filed May 3, 1926 2 Sheets-Sheet 1
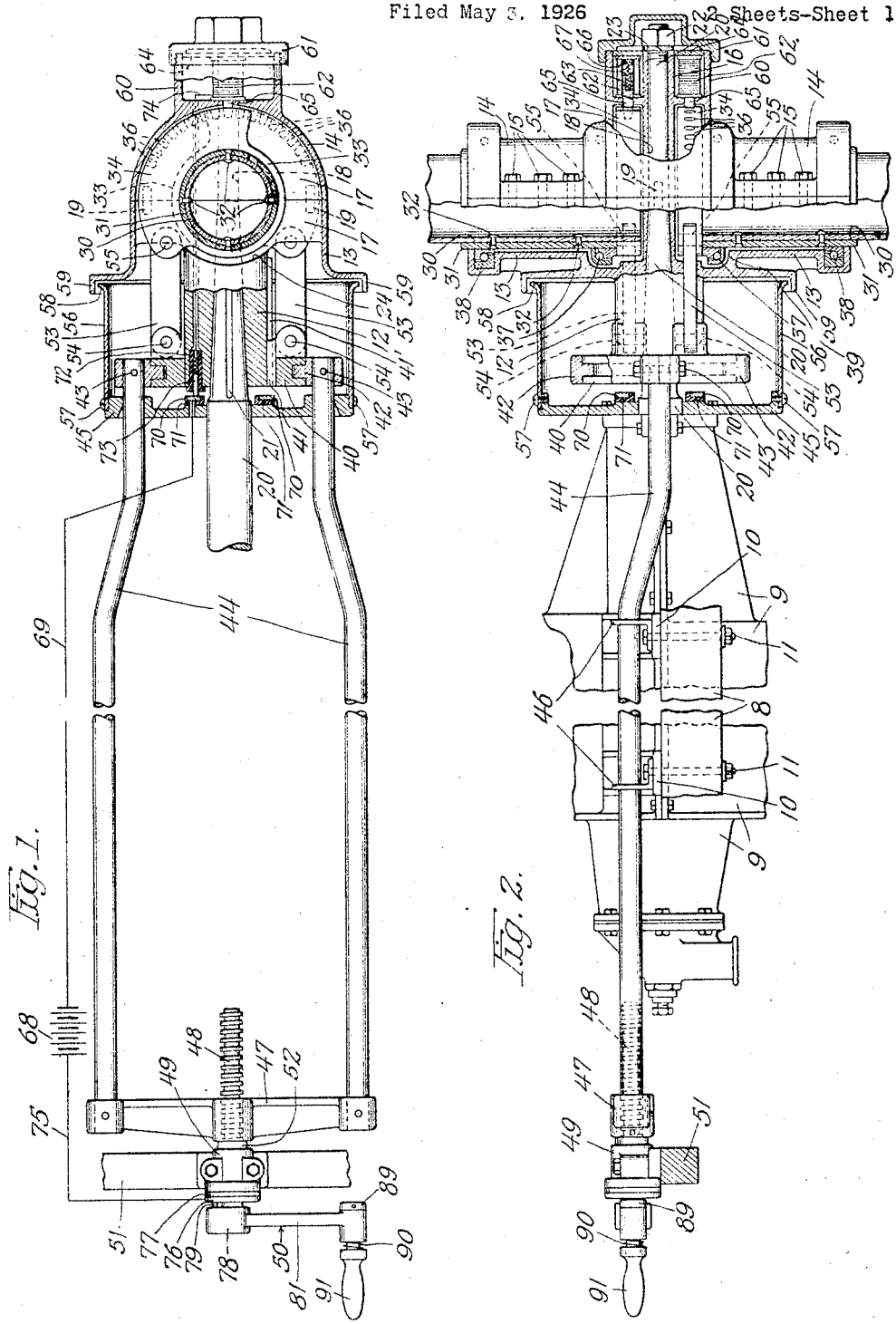
Inventor.
Moses C. Nixon

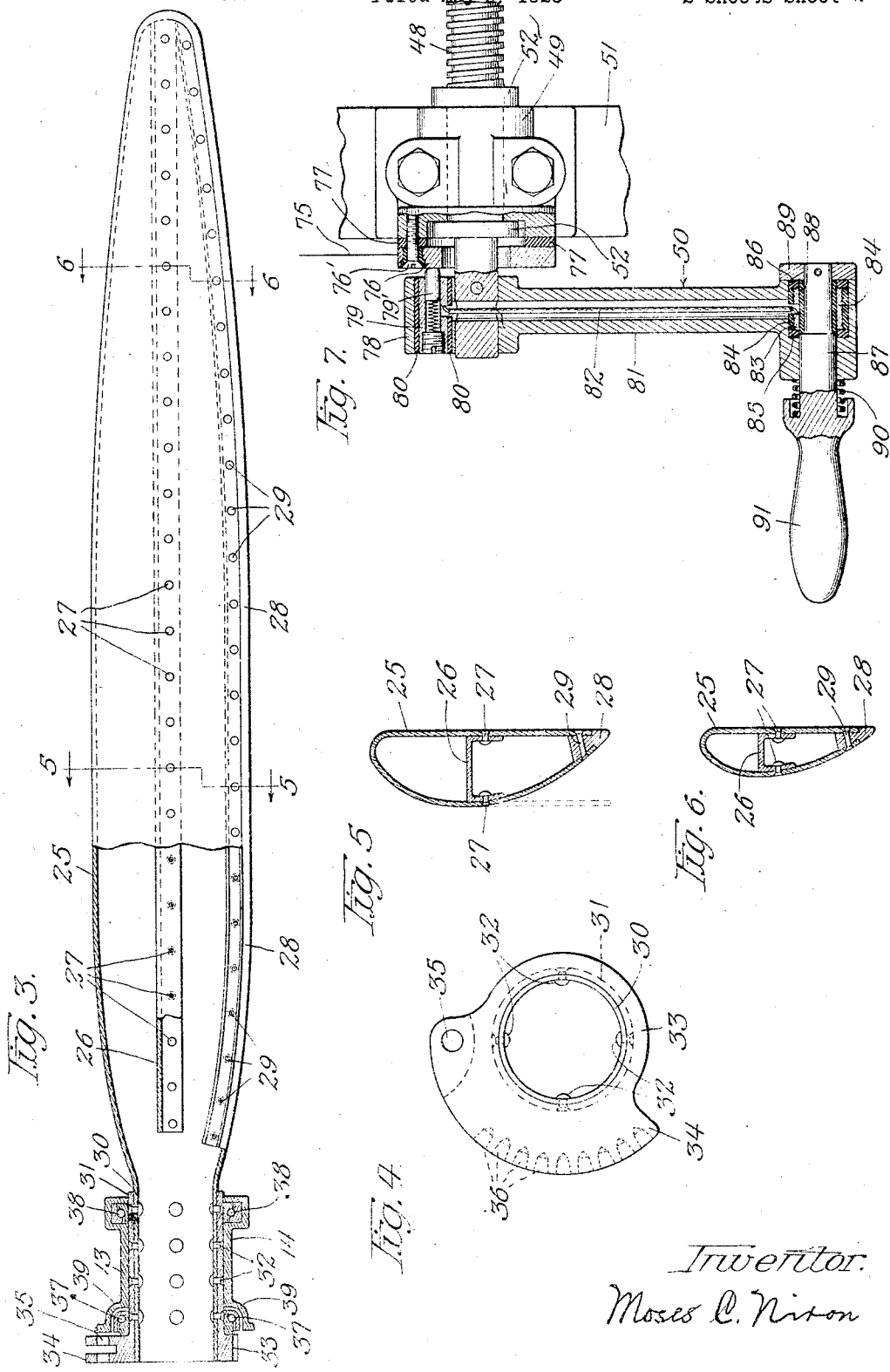

Patented Mar. 6, 1928.

1,661,632

UNITED STATES PATENT OFFICE.

MOSES C. NIXON, OF CHICAGO, ILLINOIS.

PROPELLER APPARATUS SUITABLE FOR USE IN CONNECTION WITH VARIOUS VEHICLES.

Application filed May 3, 1926. Serial No. 106,431.

The invention relates to improvements in propeller apparatus, particularly adapted for aeroplanes, hydroplanes and other aircraft, and may be used in connection with other vehicles; the object being to provide improved means by which the force exerted by the propeller may be varied or changed in a simple and efficient manner, and such other objects as may hereinafter appear; and consists, preferably, in the construction hereinafter described and illustrated, which may be varied without departing from the spirit of the invention.

In the drawings, Figure 1 is a plan view embodying certain principles of the invention, with parts broken away to better show the construction and other parts are broken out to shorten the drawings; Fig. 2 is an elevation of the same with parts also broken away to better show certain features and others are broken out to shorten the drawings; Fig. 3 is a propeller blade adapted for use in connection with other improvements; Fig. 4 is an end view showing a portion of Fig. 3; Fig. 5 is a transverse sectional view taken on line 5—5 of Fig. 3; Fig. 6 is another transverse sectional view taken on line 6—6 of Fig. 3, and Fig. 7 is an enlarged detail view of the operating mechanism, to better illustrate electrical connections.

In the drawings, similar numerals of reference indicate corresponding parts in the different views; and referring to the same, 8 represents sections of supporting stringers, which, when in place are secured to the sides of the vehicle body (not shown), and 9 the part of incasement that encloses the motor crank shafts. The motor and its incasement are supported by brackets 10 that extend from the sides of the incasement and are secured to stringers 8, as by bolts 11.

Secured to hub 12 or integral therewith is a member 13, and another member 14 is rigidly secured thereto in any suitable manner, as by bolts or screws 15, thereby forming a supporting casing for the butts of the propeller blades and associated parts, and projecting forward from member 14 and integral therewith is a sleeve or collar 16. Extending transversely across the central portion of said members and in line with the longitudinal center of the hub 12 and sleeve 16 is a rib 17, said hub, rib and sleeve being provided with an aperture 18 through their central portion. That part of the aperture carried by the hub and member 13 is tapered, and that part through the portion of rib carried by member 14 and the sleeve 16 being of uniform diameter, and the parts of the rib where they meet are provided with dowel pins 19 to assure correct placement of the members 13 and 14. The portion of driving shaft 20 that extends forward from the motor incasement is formed to fit the aperture 18, the hub and said members being secured to the shaft by a key fitted to key-way 21 and nut 22, the latter forces the hub and members onto the shaft, and the nut may be provided with a lock-washer 23 to prevent any loosening thereof. This construction not only makes the nut accessible for tightening and keeps the propeller from becoming loose on the shaft but also clamps members 13 and 14 rigidly together. The hub 12 and rib 17 is cut away at line 24 to give free movement of the operating parts.

Referring to Figs. 3, 4, 5 and 6, the propeller blade shown is constructed wholly of metal, comprising a sheet of metal 25, which in being formed is bent longitudinally and open at the edges, as indicated by dotted outline in Fig. 5, to permit fastening the reinforcement 26 within the blade. The reinforcement shown extends longitudinally of the blade, and in the present case is of channel formation, but may be of any other form suitable for the purpose and is secured to the sides of the blade in any suitable manner, as by rivets 27. After the reinforcement 26 is secured in place the edge shown in dotted outline is brought down to reinforcing edge strip 28, which is recessed to receive the edges of the sheet metal to form a smooth surface. The edges of this sheet are secured to strip 28, as by rivets 29, welding or in any other suitable manner. This construction should provide a blade of maximum strength and rigidity and quite light in weight.

The stem 30 of the blade fits into a ferrule or hub 31, and is secured thereto in any suitable manner, as by rivets 32. This hub is provided with a flange or rim 33 (see Fig. 4), of which a segment 34 extends radially far enough to afford leverage, when power is applied thereto at the hole 35 to shift the blades to different angular positions. This segment is also provided with a plurality of tapering holes or recesses 36, the purpose of which will hereinafter appear. Since the ferrule or hub and blade are built as separate units it is quite apparent that blades of other material, and construction of either the hub or blade may be changed, and other modes of securing them together adopted without departing from the spirit of the invention.

The blades are provided with radial ball bearings 37 and 38 (see Figs. 2 and 3) surrounding the hub, and inside the casing formed by members 13 and 14. Bearing 37 serves also as a thrust bearing between the rim 33 and shoulder 39 of members 13 and 14 to receive the end thrust incident to centrifugal force when the propeller is driven at a high rate of speed, thereby facilitating shifting of the blades to different angular positions.

Mounted to slide longitudinally on the hub 12 is a disc 40, which is forced to revolve therewith by a key 41 secured to the disc and adapted to slide in key-way 41'. The disc is provided with a circumferential band or collar 42, the latter being made in two parts and secured together, as by bolts 43, and moves longitudinally with the disc but is prevented from revolving therewith by rods 44, which are secured to the collar by the bolts 43. These rods pass through and are supported by an enlarged circular front plate 45 of the motor incasement. These rods pass rearward along the sides of the motor incasement, and are bent to avoid obstructions incident to construction of the same and pass through supporting guides or bearings 46, which are firmly secured in place by the bolts 11. At their rear ends these rods are connected by a crosshead 47, into which a screw 48 operates, the latter being journaled in bearing 49 and is provided with a crank handle 50 for operating the same. Said bearing is firmly secured to support 51, which in turn is secured to and supported in any suitable manner, as by the sides of the vehicle body (not shown). The journaled part of said screw is provided with a shoulder 52 on each side of the bearing 49 (see Fig. 7), which prevents longitudinal movement of the screw and when turned by the handle the screw operates to move the cross-head 47 longitudinally of the frame so as to force the collar 42 and the disc 40 backward and forward on the hub 12. This disc 40 is connected with the propeller blades by links 53, which are pivotally secured to the disc by pins 54 and to the segments 34 by pins 55, and when the disc is moved backward and forward along the hub 12, the propeller blades will be turned and the pitch or angle of the blades may be varied as desired, consequently, the propulsive force exerted by the propeller blades may be varied, the direction of force reversed, or reduced to neutral as desired, all without varying the speed of the propeller or motive power driving the same.

To protect the collar 42, disc 40, links 53, and other parts from exposure a housing 56 of cylindrical form is provided, which is rigidly secured to the enlarged plate 45, as by screws 57, with the forward end 58 turned outwardly but within the rotating rim 59, which revolves around it, and as the vehicle moves forward prevents snow, rain, etc., from entering the housing. For convenience of assembling this housing may be made in two parts, in which case the upper part should extend down over the lower to provide a storm proof construction.

Integral with member 14 and surrounding the sleeve 16 is a housing 60, with a cap 61 threaded thereon, making the housing storm proof, and installed therein, one on each side of the sleeve 16, are electro magnets 62. In the central portion of these magnets are tubes 63, that extend into the bottom of the housing 60 and outwardly through plate or washer 64 and by screwing the cap 61 down upon said washer the magnets are firmly held in place. The central portion of the cap 61 extends outwardly to give space for nut 22 and is hexagon shaped so a wrench may be applied for tightening and loosening the same. Within said tubes are pins 65, tapered at their inner ends to facilitate entrance into and withdrawal from mating holes or recesses 36 in segments 34, which also assures better seating of these pins. At the outer ends of tubes 63 are iron plugs 66, which may be secured in any suitable manner. These plugs and the pins 65 are bored at their adjacent ends to prevent displacement of spring 67, affording additional expansion of the latter and permit bringing said ends closer together and adding to efficiency of the magnets. The purpose of the springs is to force the pins into the holes or recesses 36 when not withheld by the magnets.

To energize the magnets, for removing the locking pins 65 from recesses 36, so that the pitch of the propeller blades may be adjusted, a battery 68 is provided, with a conductor 69 leading from one terminal thereof and secured to a ring-plate 70, which is firmly secured in any suitable manner, to plate 45 and is insulated therefrom by an insulating ring-plate 71. The hub 12 is longitudinally apertured with an insulating tube 72 therein, and in this tube is a brush 73 having contact with the ring-plate 70. Connected with this brush and leading through said aperture and secured to one terminal of each of the magnets 62 is a conductor 74, the other terminal of said magnets being grounded to either the housing 60 or the cap 61.

The other terminal of the battery 68 is connected with a conductor 75 and through it with a ring-plate 76, the latter being firmly secured to bearing 49 in any suitable manner, as by screw 76', but insulated therefrom by an insulating ring-plate 77. The hub 78 of the crank 50 is apertured with an insulating tube 80 therein, and in this insulating tube is a metal tube 79 and brush 79', the latter having contact with the ring-plate 76. The crank arm 81 is longitudinally apertured with a conductor 82 therein, said conductor having one terminal connected with the tube 79 and the other with a tube 83, the latter being insulated from the crank by an insulating tube 84, and rings 85 and 86, and the handle stem 87 by an insulating tube 88 around said stem, the latter being provided with a collar 89, which is yieldingly held against the crank arm by a spring 90.

In operation, by pressing the hand member 91 against the spring 90, the insulated part of the stem 87 is carried past the insulating ring 85 and contacts with the tube 83, thereby forming a ground connection. The arrangement is such that the pilot may with one hand energize the magnets whereby the locking pins will be withdrawn to release the blades, and by further operation of the crank the pilot can shift the position of the blades as desired. When the handle is released the circuit is automatically broken by the action of the spring 90 and the blades are automatically locked.

It is evident that the construction herein described may be modified and changed in various ways without departing from the spirit of the invention and I do not, therefore, confine myself to the details of construction herein shown.

I claim:

1. In a propeller apparatus, the combination with a revoluble shaft, propeller blades having segments extending radially from the hubs thereof, means for mounting the blades on said shaft and permitting rotatable adjustment of the blades about an axis at right angles to the axis of said shaft, operating means in connection with said segments whereby the blades may be moved to different positions, and means for engaging the rims of said segments for locking the blades in adjusted position.

2. In a propeller apparatus, the combination of a hub provided with a casing and adapted to be secured on a driving shaft, said casing being split transversely with respect to the axis of said shaft, a ferrule rotatably mounted in said casing, a propeller blade with its butt end secured in said ferrule, and means including a segment secured to said ferrule whereby said ferrule and blade may be rotatably adjusted.

3. In a propeller apparatus, the combination with a revoluble shaft, propeller blades having segments extending radially from their hubs with a plurality of recesses radially disposed in the rims thereof, means for mounting the blades on said shaft and permitting rotatable adjustment of the blades about an axis at right angles to the axis of said shaft, means including said segments for moving said blades to different positions, locking members operating independently of each other adapted to normally enter said recesses for locking the blades in various positions, and means for withdrawing the locking members from said recesses.

4. In a propeller apparatus, the combination with a revoluble shaft, propeller blades having segments extending radially from their hubs with a plurality of recesses radially disposed in the rims thereof, means for mounting the blades on said shaft and permitting rotatable adjustment of the blades about an axis at right angles to the axis of said shaft, means including said segments for moving said blades to different positions, and locking members adapted to enter said recesses for locking the blades in the desired position.

5. In a propeller apparatus, the combination of a hub provided with a casing and adapted to be secured on a driving shaft, said casing being split transversely with respect to the axis of said shaft, a ferrule rotatably mounted in said casing, a propeller blade with its butt end secured in said ferrule, means including a segment secured to said ferrule for rotatably adjusting said ferrule and blade, and means whereby said ferrule and blade may be locked in adjusted position.

6. In a propeller apparatus, the combination of a hub provided with a casing and adapted to be secured on a driving shaft, said casing being split transversely with respect to the axis of said shaft, a ferrule rotatably mounted in said casing, a propeller blade with its butt end secured in said ferrule, means including a segment secured to said ferrule for rotatably adjusting said ferrule and blade, means for locking said ferrule and blade in adjusted position, and means whereby said locking means may be released.

7. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including segments fixed to the respective blades and disposed within said casing, and means disposed on said casing in axial alignment with said shaft for locking the segments in the desired position.

8. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including segments fixed to the respective blades and disposed within said casings, said segments having a plurality of indentations in their rims, and locking mechanism disposed on said casing in axial alignment with said shaft and including locking members adapted to enter the indentations of the respective segments.

9. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including segments fixed to the respective blades and disposed within said casing, and means disposed on said casing and operating through an aperture provided in the casing for locking the segments in the desired position.

10. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including segments fixed to the respective blades and disposed within said casing, enclosure means carried by said casing, and locking mechanism disposed within said enclosure means and operating through an aperture provided in said casing for locking the respective segments in the desired positions.

11. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including segments fixed to the respective blades and disposed within said casing, enclosure means carried by said casing and disposed in substantial alignment with the axis of said shaft, and locking mechanism disposed within said enclosure means and operating through an aperture provided in said casing for locking the respective segments in the desired position.

12. In a propeller apparatus, the combination with a revoluble shaft, a stationary closure member through which said shaft projects, propeller blades, a casing having a hub fixed on the projecting end of said shaft, the propeller blades being mounted on said casing so that they may be rotatably adjusted about an axis at right angles to the axis of said shaft, means for adjusting the blades including members fixed to the respective blades and operating mechanism therefor movable longitudinally with respect to said hub, and housing means carried by the stationary closure member and cooperating with said casing for enclosing said operating mechanism.

13. In a propeller apparatus, the combination with a revoluble shaft, a casing mounted on said shaft in which a hub is mounted so it may be rotatably adjusted about an axis at right angles to the axis of the shaft, said hub having a projection extending radially from its axis, a propeller blade carried by said hub, and operating means connected with said projection whereby the hub and blade may be adjusted about their axis of rotation.

14. In a propeller apparatus, the combination with a revoluble shaft, propeller blades, means for mounting the blades on said shaft and permitting rotatable adjustment of the blades about an axis at right angles to the axis of said shaft, means for adjusting the blades including a crank, means for locking the blades in the various adjusted positions, releasing means for said locking means, said releasing means being operable by manipulation of the handle of the crank.

15. In a propeller apparatus, the combination with a revoluble shaft, propeller blades, means for mounting the blades on said shaft and permitting rotatable adjustment of the blades about an axis at right angles to the axis of said shaft, means for adjusting the blades including a crank, a locking device for securing the blades in the desired position, electro-magnetic means connected to a normally open circuit for rendering the locking device inoperative, said circuit being closed by means connected with the handle of the crank.

16. In a propeller apparatus, the combination with a revoluble shaft, propeller blades, means for mounting the blades on said shaft and permitting rotatable adjustment of the blades about an axis at right angles to the axis of said shaft, means for adjusting the blades including a crank, a locking device for securing the blades in the desired position, electro-magnetic means connected to a normally open circuit for rendering the locking device inoperative, said circuit being closed by manipulation of the handle of the crank.

17. In a propeller apparatus, the combination with a revoluble shaft, a hub carrying a propeller blade and provided with a laterally extending rim, means coacting with said rim for securing the hub to said shaft so it may be rotatably adjusted about an axis at right angles to the axis of the shaft, and operating means connected with said rim whereby the hub and blade may be adjusted about their axis of rotation.

18. In a propeller apparatus wherein mechanism is provided for adjusting the propeller blades, the combination of a propeller shaft which extends through and beyond said mechanism and which has tapering and uniform diameter portions, two hub parts having sleeve portions adapted respectively to engage the tapering portion and afford free axial movement on the uniform diameter portion of said shaft, said hub parts being adapted to carry the propeller blades and having parts cooperating to provide a housing for said mechanism, and a nut on the end of the shaft bearing against the outer end of the sleeve portion on the uniform diameter portion of the shaft for clamping said sleeve portions together against the shaft tapering portion thereby aiding to secure the hub parts together.

19. In a propeller apparatus, the combination with a revoluble shaft, hub means mounted on the shaft and having bearings disposed at right angles to the axis of the shaft, propeller blades having their inner ends projecting through the respective bearings, members provided on the projecting inner ends of the respective blades for holding the blades against axial movement outwardly in their bearings, mechanism connected with said members for turning the blades in their bearings, and means carried by said hub means and cooperating with said respective members for locking the blades in the desired position.

20. In a propeller apparatus, the combination with a revoluble shaft, hub means mounted on the shaft and having bearings disposed at right angles to the axis of the shaft, propeller blades having inner ends projecting through the respective bearings, members provided on the projecting inner ends of the respective blades for holding the blades against axial movement outwardly in their bearings, mechanism connected with said members for turning the blades in their bearings, said members having a plurality of recesses, and locking members carried by said hub means and adapted to project into said recesses for locking the blades in the various positions.

21. In a propeller apparatus, the combination with a revoluble shaft, hub means mounted on the shaft and having bearings disposed at right angle to the axis of the shaft, propeller blades having their inner ends projecting through the respective bearings, members provided on the projecting inner ends of the respective blades for holding the blades against axial movement outwardly in their bearings, mechanism connected with said members for turning the blades in their bearings, said members having a plurality of recesses radially disposed in their rims, locking members operating independently of each other and carried by said hub means and adapted normally to enter said recesses for locking the blades in the desired position, and means for withdrawing the locking members from said recesses.

22. In a propeller apparatus, the combination with a revoluble shaft, hub means mounted on the shaft and having bearings disposed at right angles to the axis of the shaft, propeller blades having their inner ends projecting through the respective bearings, members provided on the projecting inner ends of the respective blades for holding the blades against axial movement outwardly in their bearings, mechanism connected with said members for turning the blades in their bearings, said members having a plurality of recesses radially disposed in their rims, locking members carried by said hub means and adapted normally to enter said recesses for locking the blades in the desired position, and electro-magnetic means for withdrawing the locking members from said recesses.

23. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including rim members fixed to the respective blades and disposed within said casing, and means carried by said casing cooperating with said rim members for locking the blades in the desired position.

24. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including rim members fixed to the respective blades and disposed within said casing, said members having a plurality of indentations in their rims, and locking mechanism carried by said casing and including locking plungers adapted to enter the indentations of the respective rim members for locking the blades in various positions.

25. In a propeller apparatus, the combination with a revoluble shaft, propeller blades, a casing mounted on the shaft and in which the propeller blades are mounted so that they may be rotatably adjusted about an axis at right angles to the axis of said shaft, means for adjusting the blades including segments fixed to the respective blades and disposed within said casing, enclosure means carried by said casing, locking mechanism operating through apertures provided in said casing for locking the respective segments in the desired positions, and electro-magnetic means disposed within said enclosure means whereby the locking means may be released.

26. In a propeller apparatus, the combination with a revoluble shaft, propeller blades mounted on the shaft so they may be rotatably adjusted about an axis at right angles to the axis of the shaft, mechanism for locking the respective blades in desired positions, enclosure means, and electro-magnetic means disposed within the enclosure means whereby the locking mechanism may be released.

27. In a propeller apparatus wherein mechanism is provided for adjusting the propeller blades, the combination of a propeller shaft which extends through and beyond said mechanism and having a shoulder portion, of two hub parts each having a sleeve portion mounted on the shaft, the aperture of the sleeve in the outer hub part and the form of shaft being adapted to permit of free axial movement of the shaft in the outer sleeve portion, said hub parts being adapted to carry the propeller blades and having parts cooperating to provide a housing for said mechanism, and a nut on the end of the shaft bearing against the outer sleeve portion for clamping the sleeve portions against the shoulder portion on the shaft thereby aiding in securing the hub parts together.

28. In a propeller apparatus wherein mechanism is provided for adjusting the propeller blades, the combination of a propeller shaft which extends through and beyond said mechanism and is provided with resisting and non-resisting portions, the latter being nearest the outer end of the shaft, two hub parts having sleeve portions, the apertures of which are such as to correspond with the respective resisting and non-resisting portions of the shaft, said hub parts being adapted to carry the propeller blades and having parts cooperating to provide a housing for said mechanism, and a nut on the end of the shaft bearing against the outer end of the sleeve portion on the non-resisting portion of the shaft for clamping said sleeve portions together against the shaft resisting portion thereby aiding in securing the hub parts together.

29. In a propeller apparatus, the combination of a split hub comprising members secured together and adapted to form radially extending sockets with propeller blades secured therein, said members being provided with transversely extending bores therethrough, the bore through one of said members being tapered and the other being of uniform diameter, a propeller shaft having tapered and straight portions adapted to fit said respective bores, and a nut on the end of the shaft and adapted to draw the tapered portion of the shaft firmly into said tapered bore and thereby clamp said members together.

30. In a propeller apparatus, the combination of a propeller shaft, a portion of which being adapted to provide resistance and another portion to avoid resistance, a hub having a blade receiving socket, said hub and socket being split transversely with respect to the axis of said shaft, the inner of hub parts being bored to correspond with the resisting portion of the shaft and the outer of the hub parts being bored to admit of free axial movement on the non-resisting portion of the shaft, and a nut on the end of the shaft for securing the hub parts together and upon the shaft.

31. In a propeller apparatus, the combination of a propeller shaft a portion of which being tapered and another portion of uniform diameter, a hub having a blade receiving socket, said hub and socket being split transversely with respect to the axis of said shaft, the inner of the hub parts being bored to fit the tapered portion of the shaft and the outer of said parts being bored to fit the uniform diameter portion of the shaft, and a nut on the end of said shaft for securing the hub parts together and upon the shaft.

32. In a propeller apparatus, the combination of a propeller shaft, a hub having a blade receiving socket, said hub and socket being split transversely with respect to the axis of said shaft, the inner of said hub parts being provided with a tapering aperture and the outer of the hub parts with a uniform diameter aperture registering with the smaller end of the tapering aperture, said shaft being formed to correspond with the aperture through the hub parts, and a nut on the end of the shaft for securing the hub parts together and upon the shaft.

33. In a propeller apparatus, the combination of a revoluble shaft, propeller blades having segments extending radially from the hubs thereof with a plurality of recesses in their rims, means for mounting the blades about an axis at right angles to the axis of said shaft, means including said segments for rotating the blades in different directions, locking members operating independently of each other and adapted to enter said recesses for locking the blades in various positions, and means for withdrawing the locking members from said recesses.

34. In a propeller apparatus, the combination with a revoluble shaft, means mounted on the shaft and having bearings disposed at right angles to the axis of the shaft, propeller blades having their inner ends projecting through the respective bearings, members provided on the projecting inner ends of the respective blades for holding the blades against axial movement outwardly in their bearings, mechanism connected with said members for turning the blades in their bearings, and means whereby the blades may be locked in different positions.

35. In a propeller apparatus, the combination with a revoluble shaft, means mounted on the shaft and having bearings disposed at right angles to the axis of the shaft, propeller blades having their inner ends projecting through the respective bearings, members provided on the projecting inner ends of the respective blades for holding the blades against axial movement outwardly in their bearings, mechanism connected with said members for turning the blades in their bearings, means whereby the blades may be locked in different positions, and means for releasing said locking means.

MOSES C. NIXON.